United States Patent

Stuetz

[15] 3,671,488

[45] June 20, 1972

[54] THERMAL STABILIZATION OF ADDITION POLYMERS

[72] Inventor: Dagobert E. Stuetz, Westfield, N.J.

[73] Assignee: Celanese Corporation, New York, N.Y.

[22] Filed: May 19, 1966

[21] Appl. No.: 551,222

[52] U.S. Cl. ............... 260/45.7 R, 260/45.8 N, 260/45.9 P
[51] Int. Cl. ........................................... C08g 51/58
[58] Field of Search ............................... 260/45.7

[56] References Cited

UNITED STATES PATENTS

| | | | |
|---|---|---|---|
| 2,921,046 | 1/1960 | Arlman | 260/45.7 |
| 2,985,617 | 5/1961 | Salyer et al. | 260/45.7 |
| 3,054,767 | 9/1962 | Quinn | 260/45.7 X |
| 3,269,979 | 8/1966 | Snedeker | 260/45.7 X |
| 3,406,144 | 10/1968 | Marshall | 260/45.7 X |

OTHER PUBLICATIONS

Stille, Intro. To Polymer Chem., John Wiley, NY, 1962, pp. 7–9

*Primary Examiner*—Donald E. Czaja
*Assistant Examiner*—M. J. Welsh
*Attorney*—D. J. DeWitt and B. M. Eisen

[57] ABSTRACT

A composition comprising an addition polymer and a stabilizing amount of a compound selected from the group consisting of 9,10-dihydroanthracene, (1-8)-octahydroanthracene, phenanthrene, (1-8)-octahydrphenanthrene, acenaphthylene and (1-4)-tetrahydroacenaphthene.

1 Claim, No Drawings

THERMAL STABILIZATION OF ADDITION POLYMERS

This invention relates to the stabilization of addition polymers, in particular polyolefins, against thermal degradation.

One of the serious disadvantages of most polymeric materials is their susceptibility to thermal degradation. Although there are commercially available stabilizer systems which afford some measure of protection at moderate temperatures, they fail at high temperatures and rapid degradation results. In particular, this is the case with polypropylene beyond a temperature of about 280° C.

It is an object of this invention to stabilize polymer systems in an inexpensive manner against thermal degradation at high temperatures.

We have now discovered a special group of inexpensive polynuclear compounds which afford addition polymers unusually high protection against thermal degradation at high temperatures. These stabilizers are 9,10-dihydroanthracene; (1-8)-octahydroanthracene; phenanthrene, (1-8)-octahydrophenanthrene, acenaphthylene, acenaphthene; (1-4)-tetrahydroacenaphthene which has the structural formula:

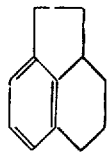

9,10-dihydroanthracene sodium sulfonate, phenanthrylmethyl triethyl ammonium chloride, acridine, and 9,10-dihydroanthylmethyl triethyl ammonium chloride.

While the above compounds provide desirable stabilization of addition polymers in general, they afford exceptional stabilization for (1) homopolymers and copolymers of olefins having two to 20 carbon atoms such as polypropylene and 3-methyl butene-1 polymers, and (2) acetal polymers, e.g. trioxane copolymers of the type described in U.S. Pat. No. 3,027,352 and (3) formaldehyde polymers of the type described in U.S. Pat. No. 2,768,994. Olefin homo- and co-polymer systems wherein the stabilization afforded by this invention is particularly desirable include polyethylene, polypropylene, ethylene-propylene co- and ter-polymers, poly-3-methyl-butene-1, polybutadiene and polyisoprenes.

The stabilizer is incorporated into the polymer by blending in as a dry powder or by spraying on in the form of a solution containing a suitable solvent such as methanol, aqueous methanol or acetone. Similarly it can be added to a polymer melt during the extrusion step.

The stabilizer is added in an amount of 0.05–1 percent, preferably 0.25 to 0.5 percent, by weight, based on the weight of the dry polymer. Ziegler-Natta type polyolefins can be stabilized by addition of these compounds in amounts based on the residual ash in the polymer (as determined by incineration in a platinum crucible). A rough rule of thumb is to add a weight percent of stabilizer equal to ten times the weight percent of residual ash. For example a polymer containing 0.03 percent residual ash is stabilized by the addition of 0.3 percent stabilizer.

The stabilizing ability of the compounds of the instant invention can be determined in a modified melt index procedure. A standard melt index apparatus is used employing a 1×-weight and a 0.040 inch diameter orifice instead of the standard 0.080 inch orifice. The melt index is determined by extruding the polymer at the given temperature by cutting the extrudate in 1 minute intervals. The weight of these 1 minute extrudates is determined in milligrams and plotted on a logarithmic scale versus the successive time intervals of collection. Thus, the weight change with time serves as a measure for the change in melt viscosity of the sample and allows an estimate of the changes in average molecular weight with time. By extrapolation of this curve to zero time, a melt index for a given polymer is obtained which is independent of the rate of degradation and is a constant characterizing a given batch of polymers. This value is termed $MI_o^T$ (e.g., at 330° C = $MI_o^{330}$). The slope of the same curve, indicating the rate of melt index increase, is termed melt index stability ($MIS^{330}$). Thus, the less stable a polymer is, the higher the MIS becomes at the same MI. On a relative scale, a MIS smaller than that for the unstabilized material indicates stabilization, whereby a MIS=0 signifies the theoretical limit, i.e. no degradation.

The preferred stabilizers of this invention are 9,10-dihydroanthracene and its derivatives. 9,10-dihydroanthracene sodium sulfonate is a preferred derivative and can be prepared in the following manner.

EXAMPLE 1

A 1-liter, four-necked flask equipped with stirrer, thermometer, reflux condenser, dropping funnel and a nitrogen inlet was charged with 140 grams of 9,10-dihydroanthracene. The flask was heated to 120°–125° C under nitrogen followed by the dropwise addition over the course of 45 minutes of 144 grams of concentrated sulfuric acid. The mixture became viscous, then slowly solidified. Two-hundred ml of water were added at 50°–60° C, followed by the addition of 100 grams of sodium hydroxide in 175 ml of water. The mixture was cooled overnight at 50°–0° C then filtered and centrifuged and the 9,10-dihydroanthracene sodium sulfonate was recovered.

Where evaporation of the stabilizer at elevated temperatures is a problem, the substituted polynuclear compounds of this invention are preferred over the corresponding unsubstituted polynuclear compounds since they are generally less volatile. Also in cases where objectionable "yellowing" of the polymer occurs, the substituted polynuclear compounds of this invention are the preferred stabilizers since they generally have better stability against actinic discoloration. Similarly, if solubility considerations are involved, the polar-substituted polynuclear compounds tend to be more soluble in relatively polar solvents than the unsubstituted polynuclear compounds.

The following data illustrates the exceptional degree of stabilization at high temperatures achievable with the stabilizers of the instant invention. Table I illustrates the effect of 9,10-dihydroanthracene on the thermal degradation of the same sample of a commercially sold polypropylene already containing a stabilizer and having a melt index, "$MI_o^T$" as above defined. "$MIS^{(n)}$" represents the melt index stability at the indicated temperature on the aforesaid commercial polypropylene additionally containing 0.5 percent by weight, based on the weight of polymer, of 9,10-dihydroanthracene. "$MIS^{(o)}$" represents the corresponding melt index stability on the same sample without the addition of any stabilizer of this invention.

TABLE I

| Temp.(°C) | $MI_o$ | $MIS^{(a)}$ | $MIS^{(o)}$ |
|---|---|---|---|
| 230 | 20 | 0 | 0.05 |
| 280 | 35 | 0.01 | 0.65 |
| 330 | 50 | 1.5 | 17.5 |

The dramatic increase in stability at temperatures of 230° C and higher is readily apparent.

Tables IIA and IIB illustrate the effect of 9,10-dihydroanthracene on the thermal degradation of a poly-3-methylbutene-1, wherein "$MI_o^T$", "$MIS^{(a)}$", and "$MIS^{(o)}$" have the above significance. Table IIA differs from that of IIB in that the poly-3-methylbutene-1 employed in Table IIB has a higher molecular weight, and thus a different $MI_o^T$ than the poly-3-methylbutene-1 of Table IIA. Both samples of polymer had a crystalline melting point of 307° C (Kofler Hot Stage, under polarized light).

TABLE IIA

| Temp.(°C) | $MI_o^T$ | $MIS^{(a)}$ | $MIS^{(o)}$ |
|---|---|---|---|
| 330 | 0.3 | 0.000 | 0.160 |
| 350 | 0.4 | 0.000 | 0.240 |
| 365 | 0.8 | 0.021 | too fast to be measured |

TABLE IIB

| | | | |
|---|---|---|---|
| 330 | 27 | 0.035 | 0.160 |
| 350 | 40 | 0.147 | 0.240 |

The high temperature stabilization of poly-3-methylbutene-1 by the method of this invention is apparent from the data. The tables also indicate that high stabilization is achieved regardless of the molecular weight of the polymer.

Tables IIIA and IIIB illustrate the stabilizing ability of the compounds of this invention. Poly-3-methylbutene-1 having a $ML_s^{330} = 0.2$ and containing 0.5 percent by weight of the indicated additives was subjected to temperatures of 330° C (Table III A) and 350° C (Table IIIB). Several polynuclear compounds outside the scope of this invention are included for comparison purposes.

TABLE IIIA

| Additive (0.5%) | $MIS^{330} \times 10^3$ |
|---|---|
| none | 160 |
| anthracene | 106 |
| chrysene | 125 |
| 9,9'-difluorenyl | 147 |
| 9,10-dihydrophenanthrene | 106 |
| phenanthrene | 17 |
| 9,10-dihydroanthracene | 0 |
| (1-8)-octahydroanthracene | 17 |
| acenaphthylene | 40 |
| acenaphthene | 30 |
| (1-4)-tetrahydroacenaphthene | 17 |

TABLE IIIB

| Additive (0.5%) | $MIS^{350} \times 10^3$ |
|---|---|
| none | 170 |
| anthracene | 127 |
| acridine | 32 |
| phenanthrylmethyl triethyl ammonium chloride | 23 |
| 9,10-dihydroanthracene sodium sulfonate | 20 |
| 9,10-dihydroanthrylmethyl triethyl ammonium chloride | 23 |
| 9,10-dihydroanthracene | 3 |

The above results clearly show the excellent stabilizing activity of the stabilizers of this invention against thermal degradation. The $MIS^{330}$ values for the polynuclear arenes not within the scope of this invention point up the fact that acceptable thermal stabilization is not a general property of polynuclear arenes or their hydrogenerated derivatives as a class. Thus, for example, while phenanthrene and 9,10-dihydroanthracene afford excellent thermal stabilization, 9,10-dihydrophenanthrene and anthracene give poor protection. Other materials which fail to produce stabilizer action include paranthrene, acridine sulfonate, benzimidazole, α-hydroxy quinoline, acetylene dicarboxylic acid mono potassium salt, p-amino benzene sulfonyl amide, 2,5-di-t-butyl hydroquinone, abietic acid and phenolphthalein.

Similar results can be found for the stabilization of acetal copolymer such as those described in U.S. Pat. No. 3,027,352 and formaldehyde polymer such as those described in U.S. Pat. No. 2,768,994.

Substitution of the polynuclear compounds of this invention with polar groups such as sulfonate and quaternary ammonium is within the scope of the invention.

Numerous other variants of the stabilized compositions discussed above within the spirit of the present invention will be apparent to one skilled in the art.

What is claimed is:

1. A composition which is stabilized against thermodegradation consisting essentially of a formaldehyde polymer and from 0.05 to 5.0 percent by weight, based on the weight of said polymer, of a stabilizer selected from the group consisting of 9,10-dihydroanthracene, (1-8)-octahydroanthracene, phenanthrene, (1-8)-octahydrophenanthrene, acenaphthylene and (1-4)-tetrahydroacenaphthene.

* * * * *